UNITED STATES PATENT OFFICE.

CARL STAHLSCHMIDT, OF BURTSCHEID, GERMANY.

PREPARING SOLUBLE SACCHARATE OF IRON.

SPECIFICATION forming part of Letters Patent No. 564,261, dated July 21, 1896.

Application filed April 30, 1896. Serial No. 589,807. (No specimens.)

*To all whom it may concern:*

Be it known that I, CARL STAHLSCHMIDT, lecturer at the Royal Technical University of Aix-la-Chapelle, a citizen of Germany, and a resident of Burtscheid, near Aix-la-Chapelle, in the Kingdom of Prussia, Germany, have invented certain new and useful improvements in processes of making a combination of sugar, hydroxid of iron, and sodium chlorid, which is soluble in water, acids, and salts, of which the following is a specification.

The chemical combination of iron and sugar hitherto known, although soluble in water, has the peculiarity of being so decomposed by acids and even neutral salts as to form a precipitate which is soluble only with a considerable excess of acids. In consequence of this the manufacture of combinations of iron and sugar is very complicated, as the hydroxid of iron serving as first material requires careful washing of the salts which formed at the precipitation if it is desired to obtain an iron-sugar combination which is perfectly soluble in water. Without removing the admixtures of hydroxid of iron, which are to be regarded as impurities in the methods of manufacture of hitherto-known iron-sugar combination, it has hitherto been impossible to produce a combination of iron and sugar perfectly soluble in water.

The present process relates to the manufacture of a combination of iron and sugar which, besides hydroxid of iron and sugar, contains considerable quantities of chlorid of sodium, instead of small quantities of sodium.

The process for the manufacture of this new product is as follows: One liter of the solution of ferric chlorid of the specific weight 1.049, containing from twenty-nine to thirty grams of ferric oxid, is diluted with one-half liter of water. In this mixture six hundred grams of sugar are dissolved, and the solution is then heated to 80° to 100° centigrade and about six hundred and forty cubic centimeters caustic lye of soda of the specific weight 1.0985 is added, which contains in one liter solution about ninety-three to ninety-five grams of sodium hydrate, (NaOH.) The solution can then be placed upon the water-bath.

The combination of chlorid of sodium, ferric oxid, and sugar gives, when dry, a shiny, black, solid mass of perfectly homogeneous structure, in which crystals of common salt are not recognizable. This combination is soluble in three times its own quantity of water. The solution is characterized by not being precipitated either by acids (sulfuric, acetic, hydrochloric, tartaric, succinic, or benzoic acid) or by salts, (chlorid of sodium, alum, sulfate of sodium.) As the hitherto-known combination of ferric oxid and sugar (ferrum oxydatum saccharatum solubile) reacts differently from the product just described, I assume that it is a new hitherto-unknown combination of chlorid of sodium, cane-sugar, and ferric oxid.

According to the relative quantities of substances used in the manufacture of the new product, its composition ought to be:

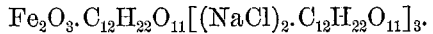

$Fe_2O_3 . C_{12}H_{22}O_{11} [(NaCl)_2 . C_{12}H_{22}O_{11}]_3.$

It will be understood that the proportion of ingredients employed and the temperatures given may be modified as may be found desirable.

Having now particularly described and ascertained the nature of my said invention and in what manner the same is to be performed, I declare that what I claim is—

The process of manufacturing the product formed of the combination of hydroxid of iron, oxid of iron, chlorid of sodium and cane-sugar soluble in water, acids and neutral salts consisting in dissolving from twenty-nine to thirty grams of perchlorid of iron and about six hundred grams of sugar in one-half liter of water, then heating to 100° centigrade and neutralizing with a caustic lye of soda, substantially as described.

In testimony that I claim the foregoing as my invention I have signed my name in presence of two subscribing witnesses.

CARL STAHLSCHMIDT.

Witnesses:
JOHN HECKMANNS,
WM. C. EMMET.